US012274674B2

(12) United States Patent
Scheuerle et al.

(10) Patent No.: US 12,274,674 B2
(45) Date of Patent: Apr. 15, 2025

(54) SYSTEMS AND METHODS FOR DELIVERING AN AGENT TO A BREASTFEEDING CHILD

(71) Applicant: JustMilk, Laguan Beach, CA (US)

(72) Inventors: Rebekah L. Scheuerle, Washington, DC (US); Geoff Galgon, Swarthmore, PA (US); Stephen E. Gerrard, Cheshire, WA (US); Rebecca A. Smith, Cambridge, MA (US); Aspen D. Flynn, Coarsegold, CA (US)

(73) Assignee: JustMilk, Laguna Beach, CA (US)

( * ) Notice: Subject to any disclaimer, the term of this patent is extended or adjusted under 35 U.S.C. 154(b) by 968 days.

(21) Appl. No.: 16/643,030

(22) PCT Filed: Sep. 8, 2017

(86) PCT No.: PCT/US2017/050836

§ 371 (c)(1),
(2) Date: Feb. 28, 2020

(87) PCT Pub. No.: WO2019/050537

PCT Pub. Date: Mar. 14, 2019

(65) Prior Publication Data

US 2020/0206083 A1 Jul. 2, 2020

(51) Int. Cl.
*A61J 7/00* (2006.01)

(52) U.S. Cl.
CPC .................................. *A61J 7/0053* (2013.01)

(58) Field of Classification Search
CPC ...... A61B 10/0051; A61M 2210/1007; A61M 1/062; A61M 1/064; A61M 1/068;
(Continued)

(56) References Cited

U.S. PATENT DOCUMENTS 2,364,866 A 12/1944 Meynier, Jr.
5,462,526 A * 10/1995 Barney .................. B32B 27/08 604/82

(Continued)

FOREIGN PATENT DOCUMENTS

WO 2017161203 9/2017
WO 2019050537 3/2019

OTHER PUBLICATIONS

International Search Report and Written Opinion received for International Application No. PCT/US2017/050836; Applicant: Justmilk, Date of Mailing; Jun. 1, 2018, 11 pages.

(Continued)

*Primary Examiner* — Kevin C Sirmons
*Assistant Examiner* — Alexandra Lalonde
(74) *Attorney, Agent, or Firm* — Perkins Coie LLP

(57) ABSTRACT

Systems, devices, and methods for delivering a therapeutic or other agent to a breastfeeding child are disclosed herein. A delivery system of the systems can include, for example, a wearable device configured to be positioned on a breast during breastfeeding. The delivery system can further include an agent source configured to house the therapeutic or other agent and a fluid source configured to supply a supplemental fluid. The agent source and the fluid source can be fluidly coupled to the wearable device via a connector. When the device is positioned on the breast and the breastfeeding child is breastfeeding, the supplemental fluid mixes with the therapeutic or other agent and flows through the connector into the wearable device and into a mouth of the breastfeeding child.

14 Claims, 8 Drawing Sheets

(58) Field of Classification Search
CPC .......... A61M 1/82; A61M 1/06; A61M 31/00; A61M 2039/0027; A61M 2210/0625; A61J 13/00; A61J 15/0011; A61J 7/0053; A61J 11/00; A61J 1/20; A61J 1/2093; A61J 9/005; A61J 7/00; A61J 11/0005; A61J 11/001; A61J 11/002; A61J 11/0035; A61J 11/0045; A61J 11/005; A61J 11/008; A61J 11/04; A61J 9/00; A61J 1/03; A61J 1/05; A61J 1/067; A61J 1/2048; A61J 1/2089; B65D 81/3272
See application file for complete search history.

(56) References Cited

U.S. PATENT DOCUMENTS

| | | | | |
|---|---|---|---|---|
| 6,253,936 | B1 * | 7/2001 | Kong | A61J 11/002 215/11.4 |
| 6,491,666 | B1 | 12/2002 | Santini, Jr. et al. | |
| 8,357,117 | B2 | 1/2013 | Sokal et al. | |
| 8,545,477 | B2 | 10/2013 | Burke et al. | |
| 2002/0129816 | A1 | 9/2002 | Williams et al. | |
| 2004/0188372 | A1 * | 9/2004 | Ruth | A61J 11/0005 215/11.4 |
| 2009/0124967 | A1 | 5/2009 | Zucker-Franklin | |
| 2010/0292637 | A1 | 11/2010 | Sokal et al. | |
| 2011/0108504 | A1 * | 5/2011 | Gust | A61J 11/00 215/11.4 |
| 2012/0165729 | A1 | 6/2012 | Cudworth | |
| 2012/0165730 | A1 | 6/2012 | McCoy et al. | |
| 2016/0287481 | A1 * | 10/2016 | Chin | G16H 20/10 |
| 2017/0049663 | A1 * | 2/2017 | Arends | A61J 11/04 |
| 2017/0113858 | A1 * | 4/2017 | Aharon | B65D 75/327 |
| 2018/0207064 | A1 * | 7/2018 | Geels | A61J 9/00 |
| 2019/0060180 | A1 | 2/2019 | Flynn et al. | |

OTHER PUBLICATIONS

International Preliminary Report on Patentability received for International Application No. PCT/US2017/050836; Applicant: Justmilk, Date of Mailing; Mar. 19, 2020, 8 pages.
International Search Report and Written Opinion received for International Application No. PCT/US2017/022836; Applicant: Justmilk, Date of Mailing; Jun. 30, 2017, 2020, 14 pages.
International Preliminary Report on Patentability received for International Application No. PCT/US2017/022836; Applicant: Justmilk, Date of Mailing; Sep. 27, 2018, 2018, 10 pages.
Hart, Catherine W. et al., "Acceptability of a nipple shield delivery system administering antiviral agents to prevent mother-to-child transmission of HIV through breastfeeding", Journal of Human Lactation, 2015, vol. 31, Issue 1, pp. 68-76.
Gerrard, Stephen et al. "A nipple shield delivery system for oral drug delivery to breastfeeding infants: Microbicide delivery to inactivate HIV", International Journal of Pharmaceutics, 2012, vol. 434, Issue 1-2, pp. 222-234.

* cited by examiner

SYSTEMS AND METHODS FOR DELIVERING AN AGENT TO A BREASTFEEDING CHILD

CROSS-REFERENCE TO RELATED APPLICATION

This application is a 35 U.S.C. § 371 U.S. National Phase application of International Patent Application No. PCT/US2017/050836, filed Sep. 8, 2017, and titled "SYSTEMS AND METHODS FOR DELIVERING AN AGENT TO A BREASTFEEDING CHILD," which is incorporated herein by reference in its entirety.

TECHNICAL FIELD

The present technology relates generally to systems and methods for delivering one or more agents orally to a child during breastfeeding.

BACKGROUND

In 2015, 4.5 million infants died worldwide, 2.7 million of which died within the first month of life. Many of these deaths could have been prevented with access to and proper administration of appropriate therapeutics. Among infants who survive, millions more suffer from levels of undernutrition that harm their development and imperil their futures. For example, in 2014, of the 667 million children in the world under five years of age, 159 million were stunted and 50 million were wasted, of whom 16 million were severely wasted. Assuring proper infant nutrition with access to appropriate forms of therapeutics is therefore of critical importance. The importance of infant nutrition is further illustrated in the substance of the Sustainable Development Goals, as indicators for at least 12 of the 17 Goals are closely tied to nutrition. The effects of malnutrition also reach far beyond the health outcomes of individuals. For example, in Africa and Asia in 2016, malnutrition represented an estimated loss of 110% GDP annually.

Breast milk is the most complete and appropriate food for infants less than 6 months of age and it is typically recommended that infants less than 6 months of age be fed breast milk exclusively. Breast milk continues to be an integral part of a mixed diet for infants up to two years of age. However, in some cases, breastfeeding alone does not provide adequate nutrition for an infant. This can occur when the mother of the infant is relactating, when the mother has low milk production such as in cases of severe maternal malnutrition or pregnancy, or when the infant needs additional nutrients (e.g., infants at risk of hypoglycaemia). After the first 6 months of an infant's life, when complementary floods are introduced, it is important that the complementary foods provide adequate nutrition for the infant. This is not always the case in low-resource settings. Notably, less than a quarter of children between 6-23 months old receive the proper diversity and amount of complementary food in many countries. This is a particularly important time period for child health, as malnutrition typically sets in after 6 months and before 2 years of age. Moreover, it is difficult for children to make up for impaired growth resulting from early malnutrition during this period. In these cases, supplementation of the child's diet can be required, especially in vegetarian contexts where nutrients such as iron may not be readily provided in complementary foods.

Common devices for delivering medicines or nutritional supplements to breastfeeding children to supplement milk production or complementary foods include spoons, syringes, and dosing cups. However, these simple devices can have drawbacks that inhibit their efficacy. For example, patient compliance is a goal in paediatric drug delivery, but even spoons can have patient acceptability hurdles. Moreover, it can be challenging to administer large doses of agents using many such delivery devices. Supplemental nursing systems have been developed to overcome these drawbacks and to, for example, administer large volumes of fluids such as breast milk or formula to breastfeeding children. In some instances, a supplemental nursing system can be used to provide nutrients to the infant to address those situations where breastfeeding alone would not be sufficient for the infant. Moreover, while some supplemental nursing systems and similar breastfeeding apparatuses have been developed for bulk delivery of fluids such as infant formula, these devices typically require liquid formulations to be pre-prepared and loaded into a reservoir.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure. Furthermore, components can be shown as transparent in certain views for clarity of illustration only and not to indicate that the illustrated component is necessarily transparent. The headings provided herein are for convenience only.

DETAILED DESCRIPTION

Figure 1A:
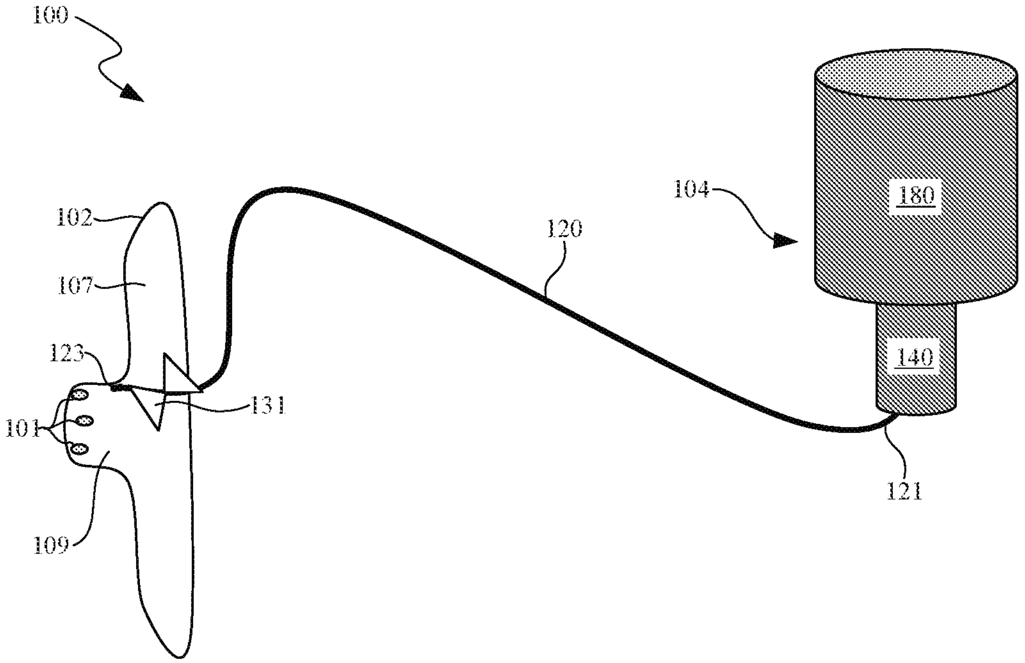
FIG. 1A is a schematic view of a delivery system in accordance with the present technology.

Aspects of the present technology are directed generally to systems for delivering an agent to a breastfeeding child. In particular, many embodiments of the present technology are directed to a delivery system including a wearable device configured to be positioned on or adjacent to a breast during breastfeeding. In some embodiments, the delivery system suspends, dissolves, or otherwise mixes a bulk amount of an agent into a supplemental fluid while the delivery system is being used during breastfeeding. For example, the delivery system can include a supplemental fluid source configured to supply a supplemental fluid to an agent source containing the agent. In certain embodiments, the supplemental fluid source can mix with the agent in the agent source and the mixture can be supplied to the wearable device for ingestion by the breastfeeding child. The mixture can be provided to the child at the same time as breast milk is provided from the breast. Such delivery systems can deliver agents that are therapeutic to and/or supplement the diet of the child at low cost and in a manner that is convenient for mothers or other users of the delivery system.

Embodiments of a novel delivery system in accordance with the present technology are described below under heading 1.0. Particular embodiments of various subcomponents of the delivery systems of the present technology are described below under headings 2.0-5.0. More specifically, selected embodiments of delivery systems including valves and/or filters are described further under heading 2.0. Selected alternate embodiments of connectors and connection structures are described further under heading 3.0. Selected alternate embodiments of agent sources are described further under heading 4.0. Lastly, selected embodiments of agents for use in the delivery systems of the present technology are described below under heading 5.0. In addition, selected examples of the present technology are described below under heading 6.0.

In the following detailed description, specific details are set forth to provide an understanding of the present technology. However, the present technology may be practiced without some of these specific details. In some instances, well-known structures and techniques have not been shown in detail so as not to obscure the present technology. The terminology used in the description presented below is intended to be interpreted in its broadest reasonable manner, even though it is being used in conjunction with a detailed description of certain specific embodiments of the disclosure. Certain terms may even be emphasized below; however, any terminology intended to be interpreted in any restricted manner will be overtly and specifically defined as such in this Detailed Description section.

For ease of reference, identical reference numbers and/or letters are used to identify similar or analogous components or features. However, the use of the same reference number does not imply that the parts should be construed to be identical. Indeed, in many examples described herein, identically numbered components refer to different embodiments that are distinct in structure and/or function.

1.0 Selected Embodiments of Delivery Devices and Methods of Use

Figure 1B:
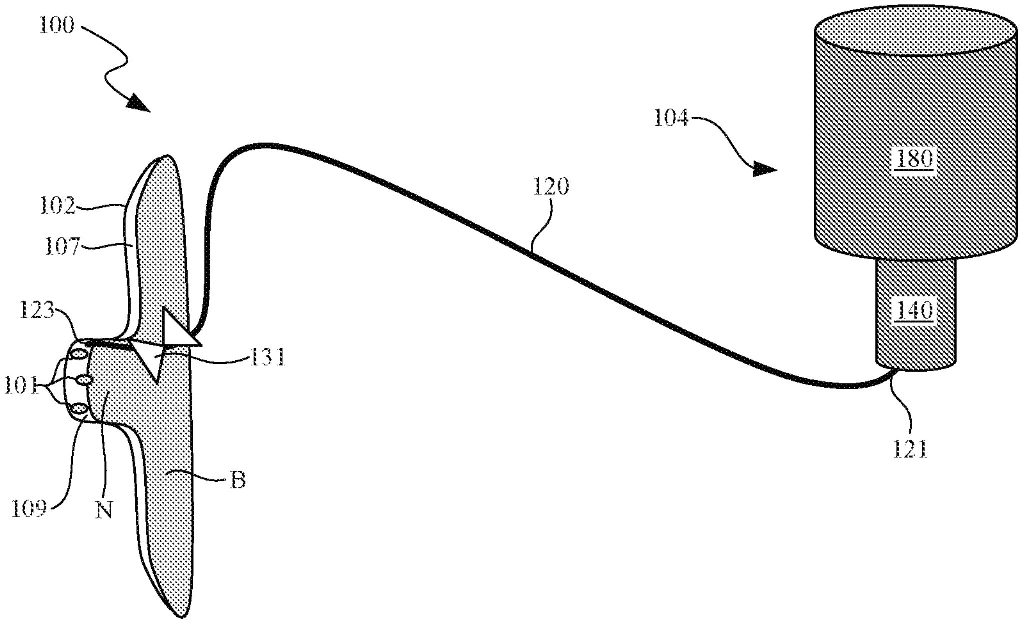
FIG. 1B is a schematic view of the delivery system of FIG. 1 shown positioned on a breast of a wearer.

FIGS. 1A and 1B are schematic views of a delivery system 100 in accordance with the present technology. In FIG. 1B, the delivery system 100 is shown positioned on a breast B of a wearer (e.g., a human mother). Referring to FIGS. 1A and 1B together, the delivery system 100 can include a wearable device 102 fluidly coupled to a supply source 104 via a connector 120. The supply source 104 can include an agent source 140 and a fluid source 180 configured to provide an agent and a fluid, respectively, to the wearable device 102. In the embodiment illustrated in FIGS. 1A and 1B, the fluid source 180 is fluidly coupled to the agent source 140, and the connector 120 is fluidly coupled to the agent source 140. As described in greater detail below in Section 2.0, in some embodiments, the delivery system 100 includes one or more valves positioned at or along the wearable device 102, the connector 120, the fluid source 180, and/or the agent source 140. For example, the delivery system 100 can include a first valve 131 positioned at the wearable device 102 and configured to control a combined flow of fluid from the fluid source 180 and agent from the agent source 140 into the wearable device 102.

Figure 1C:
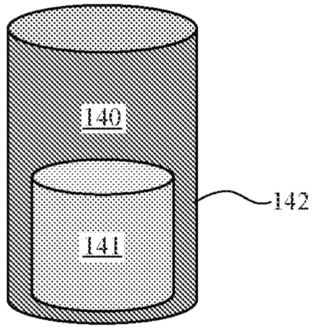
FIG. 1C is a schematic side view of an agent source of the delivery system shown in Figure TA.

The agent source 140 is generally configured to receive (e.g., hold) an agent in one or more of a variety of dosage forms (e.g., a powder, liquid, gel, gas, or other form) and supply the agent to the wearable device 102 for delivery to a breastfeeding child. For example, FIG. 1C is a schematic view of the agent source 140 showing an agent 141 positioned within the agent source 140. As shown in FIG. 1C, the agent source 140 can include a housing 142 (e.g., a flexible or rigid housing) for holding the agent 141 within the agent source 140. In the embodiment illustrated in FIG. 1C, the agent 141 is schematically illustrated as a solid, however, the agent can have any suitable form and the agent may be in one or more delivery vehicles. In some embodiments, as described in further detail in Section 5.0, the agent 141 can be any substance that can provide a therapeutic benefit to the breastfeeding child, such as pharmaceutical drugs, prodrugs, vitamins, additives, nutritional supplements, etc. Moreover, as described in further detail in Section 4.0, the agent source 140 can be configured to facilitate mixing, disintegration, dissolution, and/or suspension of the agent (e.g., the agent 141), and to facilitate transfer of the agent into the connector 120. In some embodiments, the flow and/or release of the agent from the agent source 140 may be controlled manually, gravimetrically, and/or by other suitable means, and the agent source 140 may take one of a variety of forms, such as a bag, tube, or other form. In certain embodiments, the agent source 140 includes graduated (or other) markings to indicate a volume within the agent source 140.

The fluid source 180 is configured to supply a fluid to the wearable device 102 that supplements (e.g., is distinct from) any fluid (e.g., human milk) supplied by the breast B. The supplemental fluid supplied by the fluid source 180 may be expressed breast milk, a nutritional supplement, a breast milk substitute such as baby formula, water, and/or another safe fluid or combination of fluids that can be administered to a child. In some embodiments, the agent can be added to (e.g., mixed with) the supplemental fluid before or during use of the delivery system 100. For example, the agent can be added either directly to the fluid source 180 or downstream of the fluid source 180. In certain embodiments, the fluid source 180 includes graduated (or other) markings to indicate a volume within the fluid source 180.

In the embodiment illustrated in FIGS. 1A and 1B, the fluid source 180 and the agent source 140 are separate components. However, in certain embodiments, the agent is pre-mixed within the fluid source 180 such that the delivery system 100 need not include the agent source 140. In other embodiments, the fluid source 180 and the agent source can be positioned within the same housing (e.g., formed integrally).

The connector 120 can be a tube or other suitable structure that connects the supply source 104 to the wearable device 102. In the embodiment illustrated in FIGS. 1A and 1B, a first end portion 121 of the connector 120 is coupled to the agent source 140 while a second end portion 123 of the connector 120 terminates at (e.g., within) the wearable device 102. As shown, the second end portion 123 extends past the first valve 131 and terminates within the wearable device 102. In other embodiments, the first valve 131 can be positioned at the second end portion 123 such that the connector 120 terminates within the wearable device 102 at the first valve 131. More generally, in some embodiments where there is no valve, filter, or other connection mechanism at the second end portion 123 of the connector 120, the connector 120 may be positioned along the inside (e.g., an interior surface) of the wearable device 102 until it terminates at the second end portion 123 as shown in FIGS. 1A and 1B. In such embodiments, the connector 120 could terminate anywhere within the wearable device 102. In some embodiments that include a valve, filter, or other form of apparatus that interfaces with the second end portion 123 of the connector 120, the connector 120 may be positioned along the inside of the wearable device 102 until the connector 120 terminates at the apparatus.

Figure 1D:
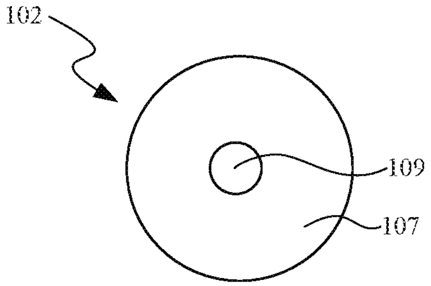
FIG. 1D is a schematic rear view of a wearable device of the delivery system shown in Figures TA.

The wearable device 102 can be a thin structure configured to be positioned over (e.g., in contact with and/or adjacent to) at least a nipple N of the breast B of the wearer. In some embodiments, the wearable device 102 is flexible (e.g., a flexible breast shield) and is configured to conform to the shape or contour of the breast B and/or nipple N of the wearer. More specifically, the wearable device 102 can include a broad portion 107 configured to fit over the breast B of the wearer and a nipple portion 109 configured to fit over the nipple N of the wearer. FIG. 1D is a schematic rear view of the wearable device 102 illustrating the broad portion 107 and the nipple portion 109. As illustrated in the embodiment of FIG. 1D, the broad portion 107 and/or nipple portion 109 can have a generally circular cross-sectional shape. In other embodiments, the broad portion 107 and/or nipple portion 109 of the wearable device 102 can have other suitable shapes (e.g., square, rectilinear, triangular, polygonal, etc.).

In some embodiments, the wearable device 102 can be made from any flexible and/or elastic material (or combination of materials). Because the wearable device 102 is flexible and easily conforms to the shape of the breast B of the wearer, the delivery system 100 can be configured for application on a wide range of breast and/or nipple sizes. Additionally, the wearable device 102 may have a soft exterior surface (e.g., an outer surface configured for contact by the breastfeeding child and inner surface configured for contact by the breast B and nipple N of the wearer) that is more comfortable for the wearer and breastfeeding child than a conventional, relatively rigid, silicone breast shield. In some embodiments, all or a portion of the exterior surface of the wearable device 102 may be textured.

The wearable device 102 further includes one or more openings 101 at the nipple portion 109 of the wearable device 102. When the delivery system 100 is positioned on the breast B and/or nipple N during breastfeeding as shown in FIG. 1B, the agent is transferred to the breastfeeding child. In particular, the agent is transferred through the openings 101 to the child either directly (e.g., when the agent has a liquid form) or in combination with (e.g., dissolved in) the supplemental fluid. Likewise, milk from the breast B of the wearer can pass through the openings 101 and to the child. In some embodiments, the child is able to receive both the milk and the agent and/or supplemental fluid simultaneously or nearly simultaneously. While three openings 101 are illustrated in FIGS. 1A and 1B, the wearable device 102 could have any number of openings 101 of any shape or arrangement without deviating from the scope of the technology. Moreover, in some embodiments, some or all of the components (e.g., the wearable device 102, the connector 120, the agent source 140, the fluid source 180, etc.) of the delivery system 100 can be made from a transparent or translucent material to assist visual assessment of the delivery system 100 (e.g., to permit visual inspection of potential clogs within the delivery system 100).

With reference to FIGS. 1A and 1B, in some embodiments, a method for delivering the agent to the child can start with positioning the wearable device 102 over at least the nipple N of the breast B of the wearer. Once the wearable device is positioned, at least the milk from the breast B can pass through the openings 101 in the nipple portion 109 of the wearable device 102 and to the child during breastfeeding. The method can further include mixing (e.g., combining, diluting, etc.) the agent and the supplemental fluid at the supply source 104. In some embodiments, the supplemental fluid flows from the fluid source 180 and into the agent source 140 to mix with the agent. The supplemental mixture of the agent and supplemental fluid can then be provided to the wearable device 102 via, for example, the connector 120 and the first valve 131. In particular, the supplemental mixture can pass through the openings 101 of the nipple portion 109 of the wearable device 102 and to the child. In some embodiments, the child receives the milk and supplemental mixture simultaneously or nearly simultaneously.

Some embodiments of the present technology can be used to supplement the complementary food intake of the breastfeeding child. In certain embodiments, the agent and/or the supplemental fluid can replace some of the necessary complementary food intake of the child. The delivery system 100 can also promote breastfeeding in general—an important practice which needs to be encouraged when infants begin taking complementary foods. Additionally, children over 6 months old who are ill are less likely to accept as much complementary food, and likely to increase their breastfeeding. Accordingly, using the delivery system 100 to provide additional nutrients during breastfeeding can ensure the child meets the nutritional requirements that breastfeeding alone would not provide. Furthermore, even children who are unable to suckle strongly can attain additional nutrition through use of the delivery system 100, since it can promote bonding of the mother and child to have the child at the breast.

As compared to presently available methods of agent delivery to children, the delivery systems and methods of the present technology: (a) make the process of agent administration more familiar and organic for a mother and breastfeeding child; (b) improve the delivery of dry agent formulations without requiring prior mixing with a supplemental fluid before use (e.g., thereby minimizing the use of potentially unclean preparation sources, providing convenience to the mother, and avoiding the need for refrigerated storage of some liquid or syrup formulations); (c) allow easy control of the dosage of an agent separate from that of a supplemental fluid during use of the delivery system; (d) reduce the number and complexity of tasks that mothers have to perform in order to administer potentially lifesaving therapeutics; (e) increase bioavailability of some intended therapeutics through potentially using milk as a delivery agent; (f) promote breastfeeding when agent delivery to the infant is required (e.g., thereby encouraging bonding between the mother and infant); (g) combine agent delivery and child suckling at the breast (e.g., thereby potentially encouraging milk production in mothers with low milk production or who are relactating); (h) promote breastfeeding among complementary feeding infants by combining nutritional supplementation with breastfeeding; and (i) improve the ability to administer therapeutic agents for some undernourished, sick, and/or premature infant populations and/or others clinically determined in need of supplementation of agents in an alternative way.

By realizing even some or all of these advantages, the present technology could be transformative for the lives of mothers and breastfeeding children and for the field of pediatric agent delivery, improving the health outcomes of millions of breastfeeding children globally by addressing the identified need for new low cost devices, systems, and methods for delivering agents to breastfeeding children.

2.0 Selected Embodiments of Delivery Systems Including Valves and/or Filters

In general, the delivery system 100 shown in FIGS. 1A-1D can include one or more valves and/or filters for regulating the flow of the agent and/or the supplemental fluid within the delivery system 100. FIGS. 2-5 are schematic views of portions of the delivery system 100 shown in FIGS. 1A-1D including valves and/or filters configured in accordance with the present technology. Certain features or aspects of the embodiments disclosed herein with reference to FIGS. 2-5 can be combined or eliminated in other embodiments, even if not explicitly noted.

Figure 2:
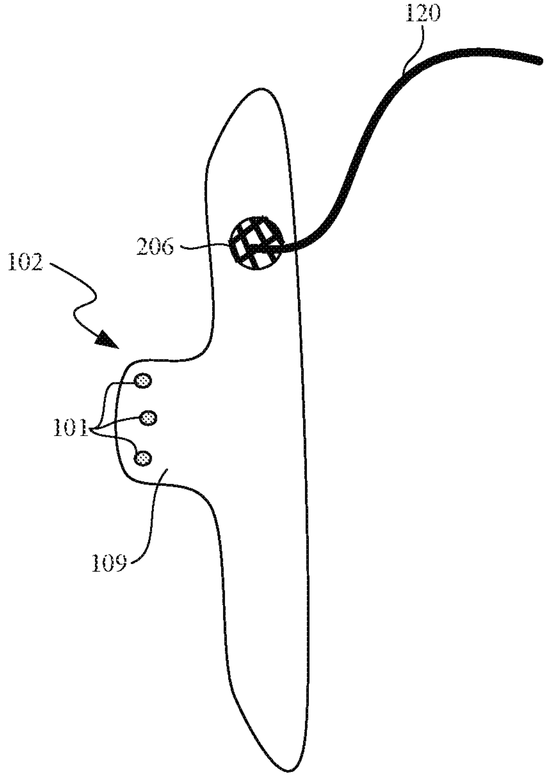
FIG. 2 is a schematic side view of the wearable device of the delivery system shown in FIG. 1 in accordance with embodiments of the present technology.
Figure 3:
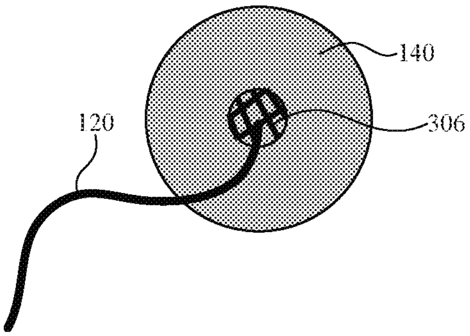
FIG. 3 is a schematic bottom view of the agent source of the delivery system shown in FIG. 1 in accordance with embodiments of the present technology.

More specifically, the delivery system 100 can include one or more filters for inhibiting or controlling the size of portions (e.g., clumps) of the agent moving through the delivery system 100. For example, FIG. 2 is a schematic side view of a portion of the connector 120 and the wearable device 102 including a filter 206 in accordance with the present technology. The filter 206 can be positioned at a connection point (e.g., interface) between the wearable device 102 and the connector 120. The 206 can, for example, inhibit clumps of the agent from reaching the wearable device 102 and/or passing through the openings 101 of the nipple portion 109 of the wearable device 102. Similarly, FIG. 3 is a schematic bottom view of the agent source 140 and a portion of the connector 120, and illustrating a filter 306 positioned between the agent source 140 and the connector 120 in accordance with the present technology. The filter 306 can, for example, inhibit clumps of the agent from passing from the agent source 140 and into the connector 120, where the clumps may clog the connector 120 and prevent or inhibit flow through the connector 120.

Figure 4:
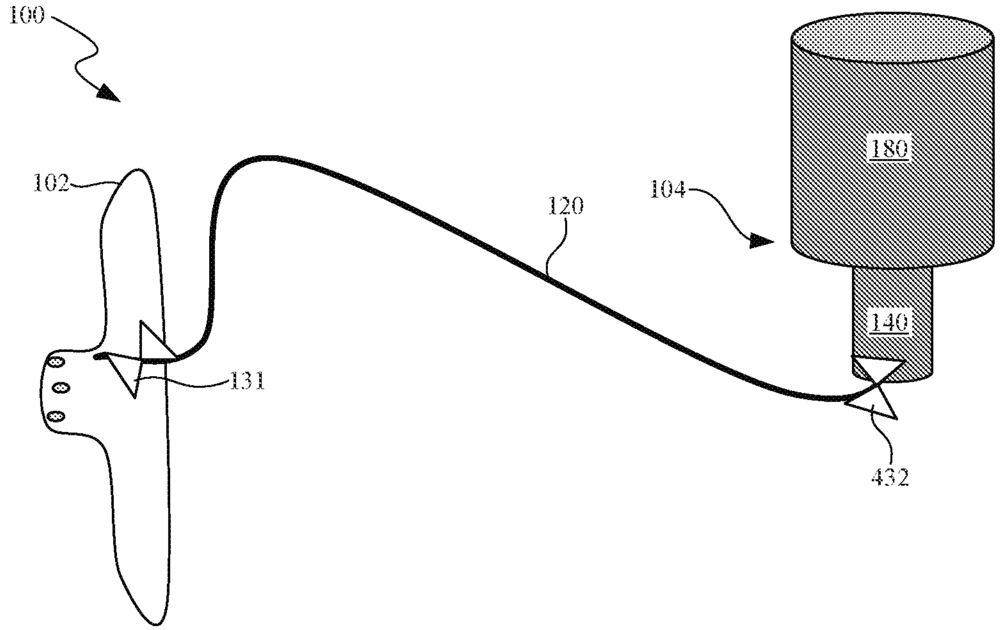
FIG. 4 is a schematic view of the delivery system shown in FIG. 1 in accordance with another embodiment of the present technology.
Figure 5:
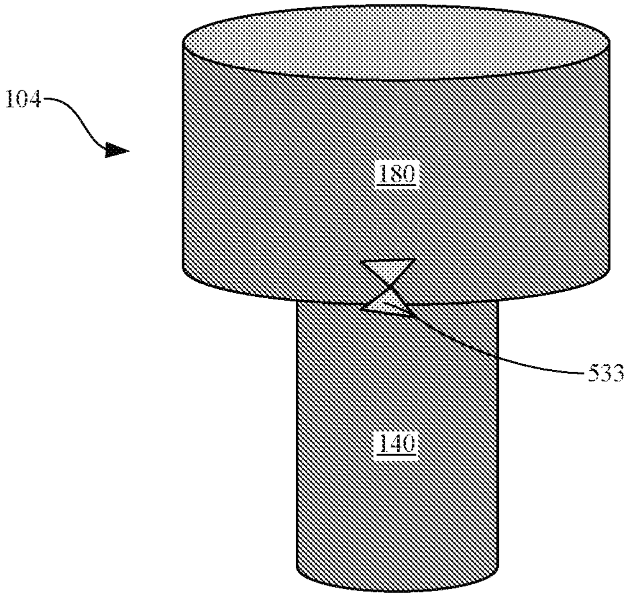
FIG. 5 is a schematic side view of a supply source of the delivery system shown in FIG. 1 in accordance with embodiments of the present technology.

In certain embodiments, the delivery system 100 may include one or more valves for controlling the flow of the supplemental fluid from the fluid source 180 and the agent from the agent source 140 within the delivery system 100. For example, FIG. 4 is a schematic view of the delivery system 100 having a second valve 432 in accordance with the present technology. As shown, the connector 120 may connect to the agent source 140 via the second valve 432. In some embodiments, the second valve 432 can control (e.g., regulate) the flow of the supplemental fluid and/or agent from the supply source 104. In certain embodiments, the first and second valves 131, 432 can operate together to control the flow of the supplemental fluid and/or agent to the wearable device 102. In some embodiments, the delivery system 100 includes only the second valve 432 and not the first valve 131. Likewise, FIG. 5 is a schematic side view of the supply source 104 illustrating a third valve 533 positioned between the fluid source 180 and the agent source 140 to control fluid flow from the fluid source 180 to the agent source 140. In certain embodiments, the third valve 533 can be closed to prevent or substantially inhibit fluid flow between the agent source 140 and fluid source 180 prior to use of the delivery system 100 during breastfeeding.

In other embodiments, the delivery system 100 could have additional valves, filters, and/or connection elements without deviating from the scope of the present technology.

3.0 Selected Alternate Embodiments of Connectors

Figure 6:
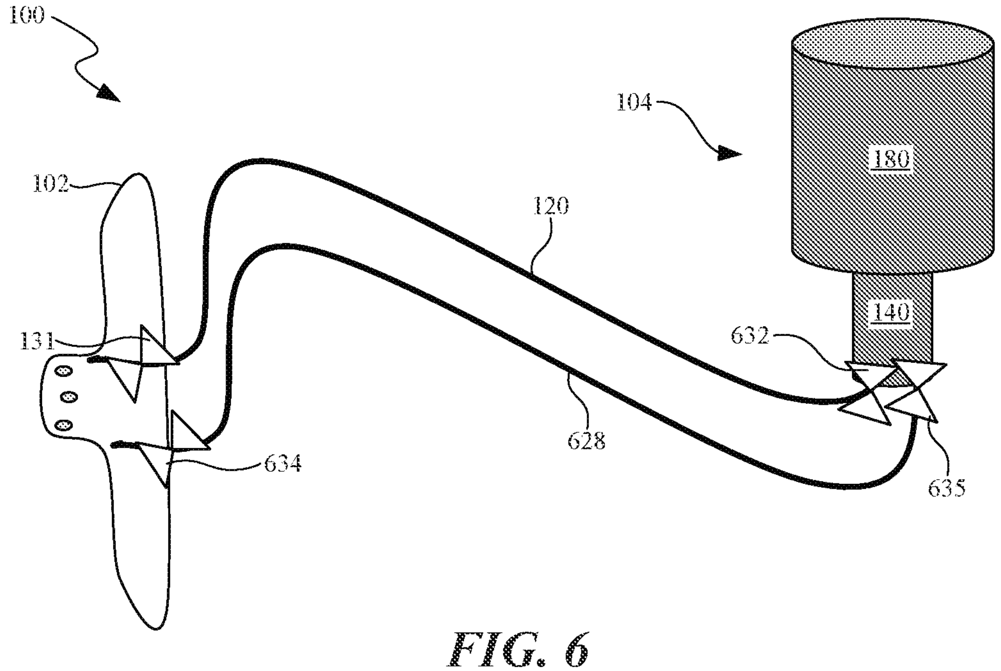
FIGS. 6-8 are schematic views of connectors of the delivery system shown in FIG. 1 in accordance with embodiments of the present technology.
Figure 7:
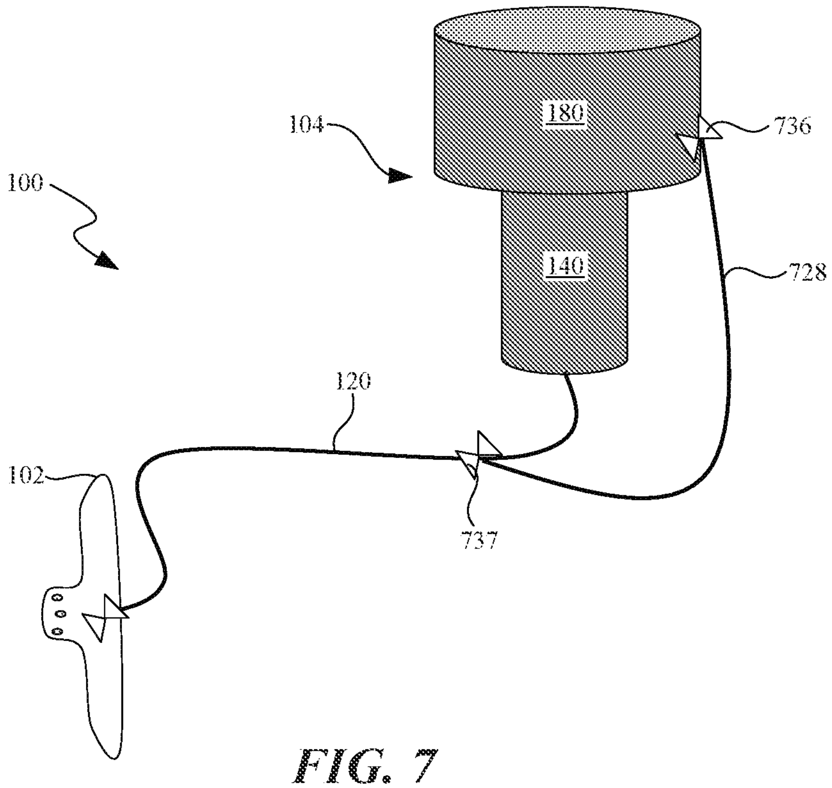
Figure 8:
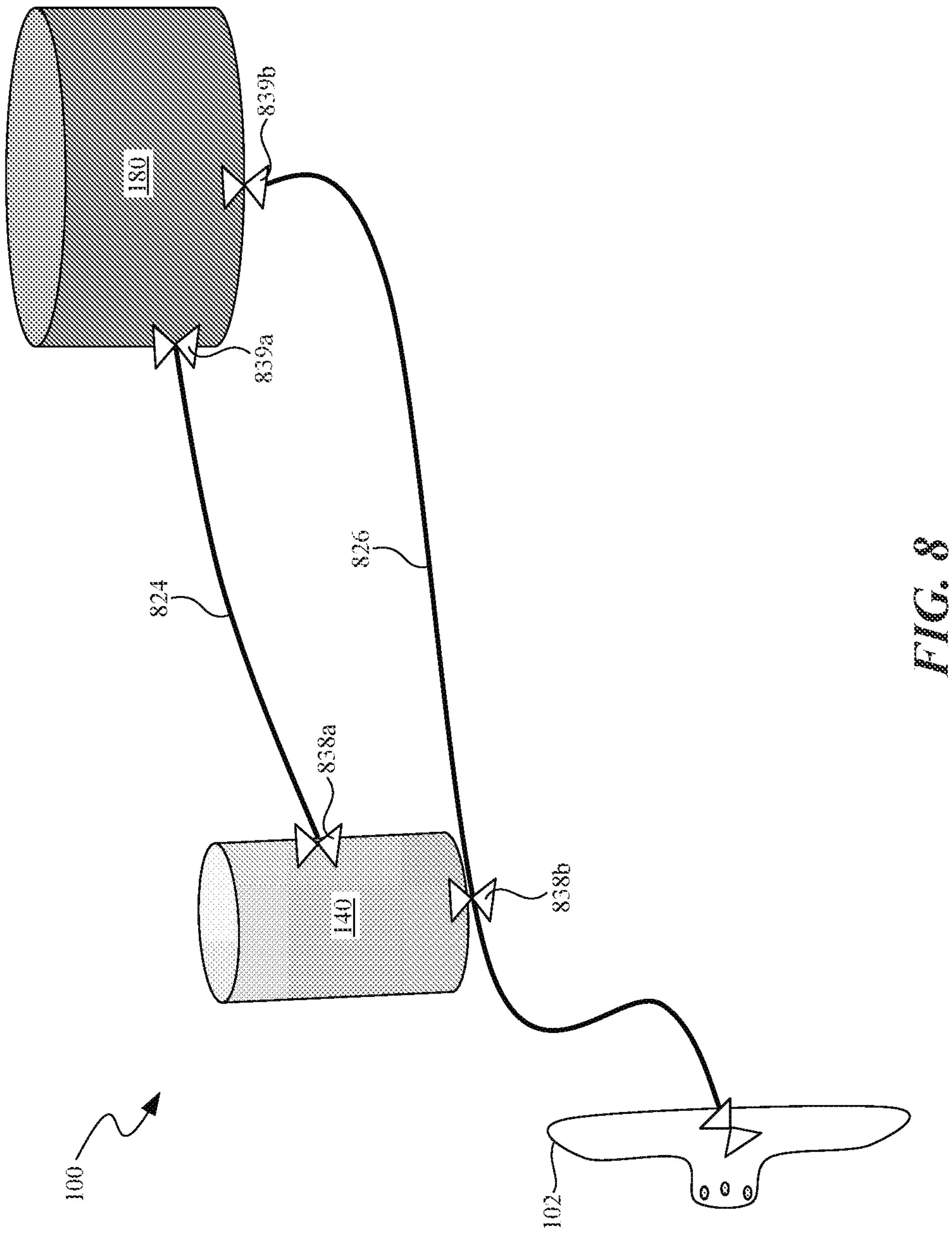

In general, the delivery system 100 shown in FIGS. 1A-1D can include any suitable connector or combination of connectors for fluidly coupling and/or connecting the fluid source 180 and agent source 140 to the wearable device 102. FIGS. 6-8 are schematic views of connectors of the delivery system 100 shown in FIG. 1 in accordance with the present technology. Certain features or aspects of the embodiments disclosed herein with reference to FIGS. 6-8 can be combined or eliminated in other embodiments, even if not explicitly noted.

In some embodiments, there may be more than one connector (e.g., a tube, channel, line, etc.) fluidly coupling the supply source 104 to the wearable device 102. For example, FIG. 6 is a schematic view of the delivery system 100 including a second connector 628 directly connected to the agent source 140 and fluidly coupling the supply source 104 to the wearable device 102. In the embodiment illustrated in FIG. 6, the connector 120 is connected to the wearable device via the first valve 131 and to the agent source by a second valve 632. Likewise, the second connector 628 is connected to the wearable device 102 by a second valve 634 and to the agent source 140 by a third valve 635. As described above in Section 2.0, in other embodiments there may be other forms of connections, for example comprising a filter at the connection points to the wearable device 102 and/or agent source 140, and/or other types of connections. In other embodiments, any number of connectors can be used to couple the supply source 104 to the wearable device 102. In some embodiments (e.g., where there is no valve, filter, or other connection mechanism between the connectors 120, 628 and the wearable device 102), the connectors 120, 628 can run along the inside of the wearable device 102 until they terminate, which could be anywhere within the wearable device 102.

FIG. 7 is a schematic view of the delivery system 100 including a second connector 728 configured in accordance with the present technology. As shown, the second connector 728 is connected to the fluid source 180 via a first valve 736 and to the connector 120 via a second valve 737. In other embodiments, the second connector 728 can be coupled to the fluid source 180 and connector 120 directly (e.g., without valves). Accordingly, the connectors 120, 728 together fluidly couple the supply source 104 to the wearable device 102. In such an embodiment, the fluid source 180 need not be directly coupled (e.g., fluidly coupled) to the agent source 140.

FIG. 8 is a schematic view of yet another embodiment of the delivery system 100 including multiple connectors between the supply source 104 and the wearable device 102. In particular, the delivery system 100 can include a first connector 824 extending between and fluidly coupling the fluid source 180 and the agent source 140, and a second connector 826 fluidly coupling the agent source 140 and the fluid source 180 to the wearable device 102. The first connector 824 allows the agent in the agent source 140 to be wetted by the supplemental fluid from the fluid source 180. Moreover, the agent source 140 can be coupled to the second connector 828 anywhere along the extent of the second connector 828. In some embodiments, the agent source 140 can be connected to the first connector 824 via a first valve 838*a* and to the second connector 826 via a second valve

838*b*. Control of the flow from the agent source 140 into the second connector 826 may be facilitated by the use of the second valve 838*b*. Likewise, in some embodiments, the fluid source 180 can be connected to the first connector 824 by a first valve 839*a* and to the second connector 826 by a second valve 839*b*. In some such embodiments, flow from the fluid source 180 to the agent source 140 can be controlled using the first valve 839*a*, and fluid flow from the first connector 824 into the agent source 140 can be controlled using the first valve 838*a*. In other embodiments, the delivery system 100 may have other forms of control mechanisms used at the intersections of the agent source 140 with the first and second connectors 824, 826, and the fluid source 180 with the first and second connectors 824, 826. For example, filters can be positioned at these intersections to control the size of clumps that move into the first and/or second connector 824, 826.

4.0 Selected Alternate Embodiments of Agent Sources

In general, the agent source 140 can have any suitable features for promoting mixing, disintegration, dissolution, suspension, transfer, etc. of the agent. FIGS. 9-20 are schematic views of portions of different embodiments of the agent source 140 illustrated in FIGS. 1A-1D. Certain features or aspects of the embodiments disclosed herein with reference to FIGS. 9-20 can be combined or eliminated in other embodiments, even if not explicitly noted.

Figure 9:
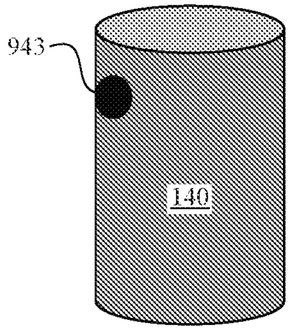
FIGS. 9-19 are schematic side views of the agent source of the delivery system shown in FIG. 1 in accordance with embodiments of the present technology.

In some embodiments, as illustrated in the schematic view of FIG. 9, the agent source 140 can include one or more ports 943 through which more agent can be added. For example, in certain embodiments, the agent source 140 can be distributed to a wearer with the agent pre-loaded within the agent source 140, and the user can subsequently refill or add more agent to the agent source 140 via the ports 943 after use.

Figure 10:
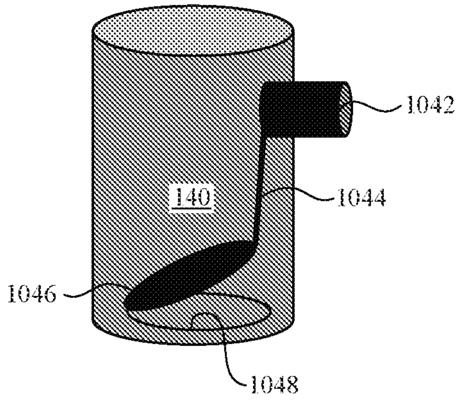

In some embodiments, the agent source 140 includes components for facilitating releasing, mixing, disintegrating, etc. of the agent within the agent source 140. For example, in certain embodiments, the agent source 140 can be flexible so that it can be squeezed to facilitate release, mixing, disintegration, etc. FIG. 10 is a schematic view of an embodiment in which the agent source 140 is a rigid structure including a button 1042 for releasing the agent. In the embodiment illustrated in FIG. 10, the button 1042 is coupled to a lever 1044 that is coupled to a cover 1046. The cover 1046 is configured to block off (e.g., close) a port 1048 that can, for example be fluidly connected to a connector (e.g., the connector 120). When the button 1042 is pressed (e.g., by the wearer of delivery system 100), the cover 1046 is released (e.g., does not cover the port 1048) and thereby fluidly connects the agent source 140 to the connector. In some embodiments, pushing (e.g., clicking, depressing, etc.) the button 1042 inverts the shockwave of the push to cause movement of the contents in the agent source 140, thereby promoting mixing of the agent. In certain embodiments, the button 1042 is further coupled to other components (e.g., a concave disk) for promoting mixing of the agent.

Figure 11:
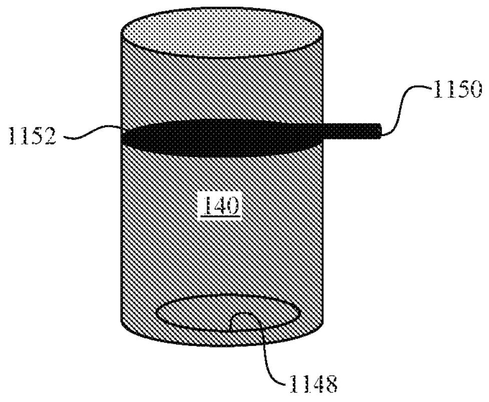

FIG. 11 is a schematic view of the agent source 140 in accordance with another embodiment of present technology. In the embodiment illustrated in FIG. 11, the agent source 140 may be a rigid structure including a port 1148, an internal plunging mechanism 1152, and a handle 1150 coupled to the internal plunging mechanism 1152. The agent can be released (e.g., transferred to the connector 120 or another connector) by pushing the handle 1150 downwards to thereby force the internal plunging mechanism 1152 downwards toward the port 1148—forcing any agent below the internal plunging mechanism 1152 out of the agent source 140.

Figure 12:
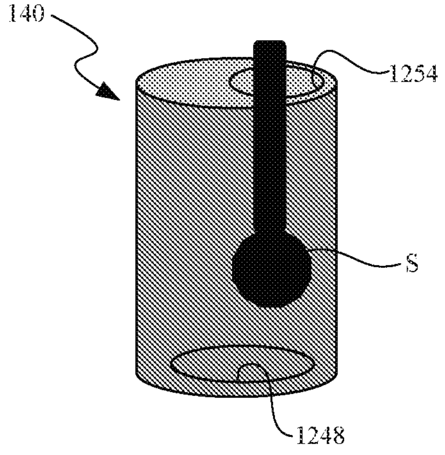
Figure 13:
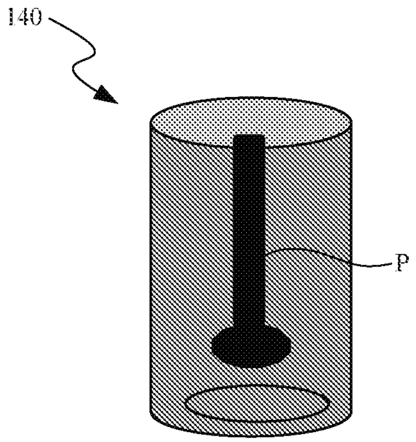

FIG. 12 is a schematic view of the agent source 140 in accordance with another embodiment of present technology. In the embodiment illustrated in FIG. 12, the agent source 140 has an upper port 1254 in an upper portion of the agent source 140. The upper port 1254 can be used for refilling the agent source 140 and can also permit a mixing utensil to be inserted therethrough. As shown, the mixing utensil can comprise a spoon S. However, in other embodiments, the mixing utensil can be a paddle, whisk, or other mixing device. In some embodiments, the mixing utensil can be used to release the agent via, for example, a lower port 1248 in a lower portion of the agent source 140. Similarly, FIG. 13 is a schematic view of another embodiment in which a mixing utensil (e.g., a paddle P) is fixed inside the agent source 140. Rotation or other movement of the agent source 140 can cause relative movement between the agent source 140 (e.g., a housing of the agent source 140) and the paddle P to promote and/or facilitate mixing of the agent. In other embodiments, the mixing tool can be a tool other than the paddle P, such as a whisk or other mixing device.

Figure 14:
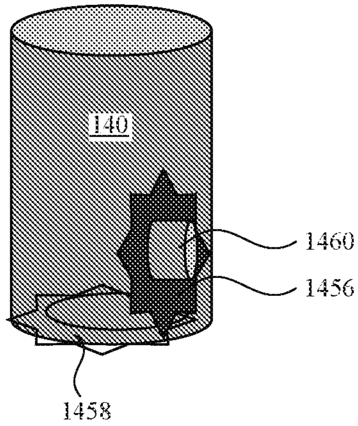

FIG. 14 is a schematic view of the agent source 140 in accordance with another embodiment of present technology. In the embodiment illustrated in FIG. 14, a dial 1460 is coupled to the agent source 140 which, when turned, results in rotation of the agent source 140 for the purposes of mixing, disintegrating, dissolving, or suspending the agent. More specifically, turning the dial 1460 can drive motion of the agent source 140 via relative motion of a first gear 1456 and a second gear 1458. For example, the first gear 1456 can be coupled to the dial 1460 and can have teeth that interlock (e.g., interweave, mesh with, etc.) teeth of the second gear 1458. Accordingly, rotation of the dial 1460 can drive the first and second gears 1456, 1458 to mix the agent. In other embodiments, more than two gears may be incorporated and still be within the scope of the technology.

Figure 15:
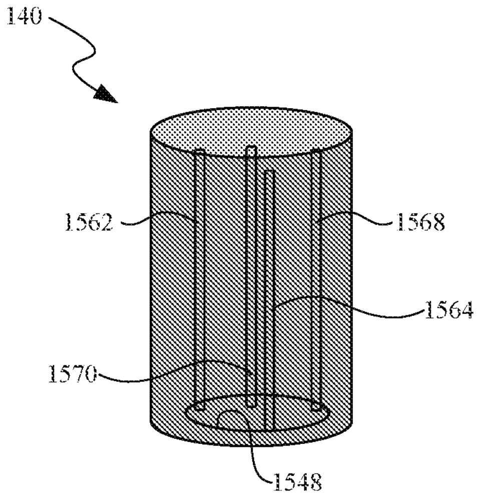

In some embodiments, the agent source 140 is configured to hold more than one agent (e.g., two or more different agents) or two or more portions of the same agent. For example, FIG. 15 is a schematic view of an embodiment in which the agent source 140 includes multiple channels in accordance with present technology. In the embodiment illustrated in FIG. 15, the agent source 140 includes a first channel 1562, a second channel 1564, a third channel 1568, and fourth channel 1570 (collectively "channels 1562-1570"). Each of the channels 1562-1570 can extend partially or entirely through the agent source 140 and can contain the same or different agents. Moreover, each of the channels 1562-1570 can terminate at a port 1548 that is, for example, fluidly coupled to the connector 120. While four channels 1562-1570 are illustrated in FIG. 15, the agent source 140 could include any other number of channels. By including multiple channels, the embodiment illustrated in FIG. 15 can minimize the risk that clogging in the agent source would completely block fluid flow into the connector.

Figure 16:
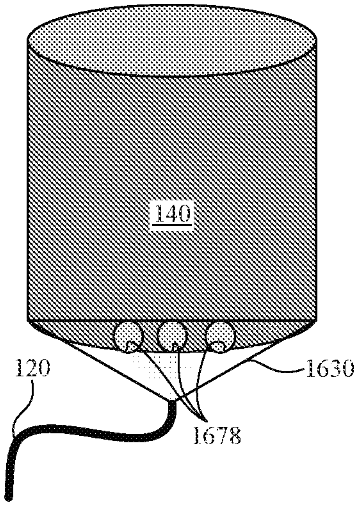

In certain embodiments, the agent source 140 can include multiple ports for connecting to the connector 120. For example, FIG. 16 is a schematic view of an embodiment in which the agent source 140 has multiple ports (e.g., holes, openings, etc.) 1678. The multiple ports 1678 can serve to minimize the impact of clogging on any one or more of the ports 1678. While three circular ports 1678 are illustrated in FIG. 16, in other embodiments the agent source 140 can have any number of ports 1678 of any shape (e.g., square, polygonal, oval, etc.) and in any configuration. In the embodiment illustrated in FIG. 16, the agent source 140 can further include a funnel 1630 positioned between the agent source 140 and the connector 120 to facilitate agent transfer through the ports 1678 and into the connector 120. In other embodiments, the funnel 1630 may not be necessary, and the connector 120 can have an opening that is wide enough to surround part of the surface of the agent source 140. In some such embodiments, the connector 120 can narrow as the tubing nears the wearable device 102.

Figure 17:
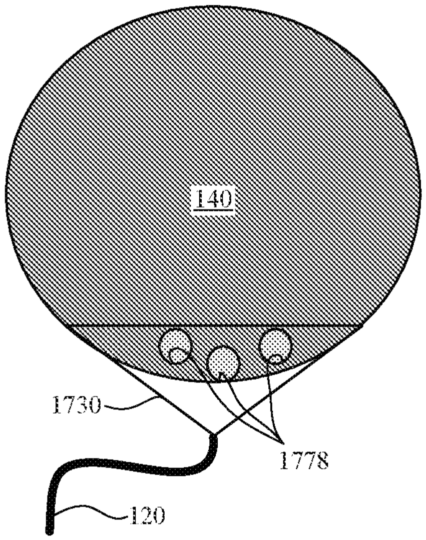

FIG. 17 is a schematic view of the agent source 140 in accordance with another embodiment of present technology. In the embodiment illustrated in FIG. 17, the agent source 140 includes multiple ports 1778 and has a generally spherical shape. In other embodiments, the agent source could be any other shape (e.g., conical, cylindrical, frustoconical, cubical, etc.) without deviating from the scope of the present technology The agent source can further include a include a funnel 1730 positioned between the agent source 140 and the connector 120 to facilitate agent transfer through the ports 1778 and into the connector 120.

Figure 18:
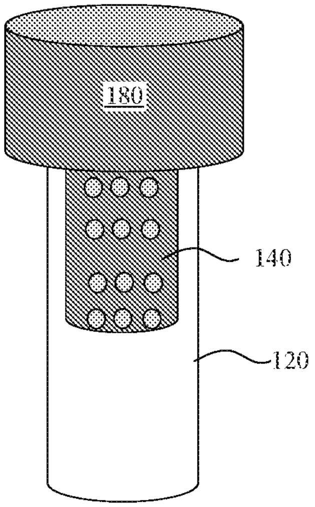

FIG. 18 is schematic view of another embodiment of the agent source 140 in which the agent source 140 is perforated in accordance with the present technology. In the embodiment illustrated in FIG. 18, the agent source 140 can be radially surrounded or nearly surrounded by a portion of the connector 120. The connector 120 can abut (e.g., be positioned against or proximate to) the fluid source 180 to form a sealed or nearly sealed region for receiving the supplemental fluid and/or the agent. In some embodiments, the connector 120 can be configured (e.g., shaped and sized) to wholly or nearly wholly surround the agent source 140 when the agent source 140 has a different shape (e.g., spherical). Moreover, the perforations in the agent source 140 can have any number, shape, and/or configuration without deviating from the scope of the technology.

Figure 19:
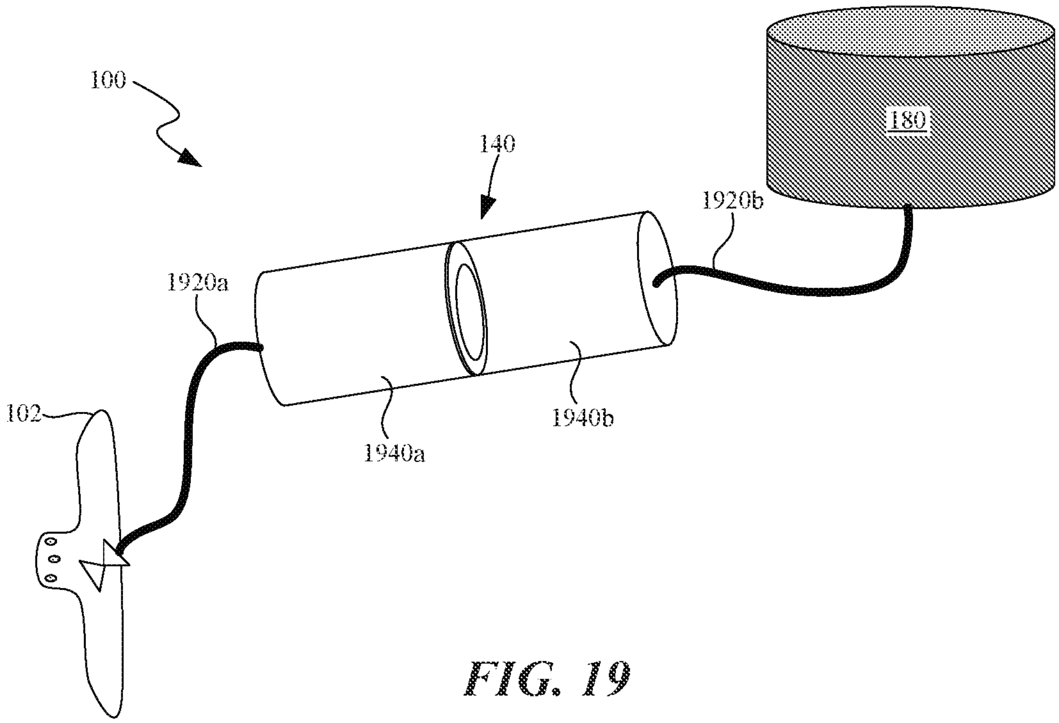

In some embodiments, the agent source 140 can include multiple, discrete agent-holding structures. The multiple agent-holding structures can be individually coupled to the wearable device 102 or can be coupled together (e.g., in series, in parallel, etc.) For example, FIG. 19 is a schematic view of the delivery system 100 wherein the agent source 140 includes multiple agent-holding structures. In the embodiment illustrated in FIG. 19, the agent source 140 comprises a first agent source 1940*a* fluidly coupled in series to a second agent 1940*b*. A first connector 1920*a* can fluidly couple the first agent source 1940*a* to the wearable device 102, while a second connector 1920*b* can fluidly couple the second agent source 1940*b* to the fluid source 180. In some embodiments, more than two agent sources can be connected in series without deviating from the scope of the technology.

5.0 Selected Embodiments of Agents

Each of the delivery systems described above with reference to FIGS. 1A-19 are configured to deliver one or more agents to the wearable device 102 for delivery to a breastfeeding child. In some embodiments the agent can be dissolvable, easily suspended, easily disintegrated, easily mixed, and/or easily diluted in the supplemental fluid supplied by the fluid source 180. The agent can be any substance that can provide a therapeutic benefit to the child, such as pharmaceutical drugs, prodrugs, vitamins, additives, nutritional supplements, etc. More specifically, the agent can be a therapeutic or combination of therapeutics which is efficacious in the treatment and/or prevention of vitamin deficiency (e.g., vitamin A, vitamin C, vitamin D, etc.) and/or mineral deficiency (e.g., iron, zinc, calcium, folate, etc.) and/or malnourishment (e.g., alpha-lactalbumin, polyunsaturated fatty acids, etc.), generalized or localized pain, allergic reactions, seizure, infection (e.g., parasitic, bacterial, leprotic, tuberculotic, fungal, viral, retroviral, hepatic, protozoal, etc.), migraine, immune system disorders, imbalances, or autoimmune disease, hormonal imbalances, endocrine disorders, anaemia, haemoglobinopathies, hypertension, lipid disorders, dermatological disease (e.g., fungal, infective, pruritic, scabicidal, etc.), ophthalmic disease, sepsis, gastrointestinal disease (e.g., ulcers, vomiting, nausea, constipation, etc.), diarrhea, dehydration, poisoning, venom toxicity, inflammation, psychosis, mood disorders, depression, psychiatric disorders, asthma, electrolyte and acid-base disturbances, joint disease, rheumatoid disorders, and/or any other pathology. The agent may include any therapeutic contained in the World Health Organization's (WHO's) Essential Medicines List (WHO et al., *19th WHO Model List of Essential Medicines* (April 2015), 19th edition. 2015, pp. 1-53), the WHO'S Essential Medicines List for Children (WHO et al., *5th WHO Model List of Essential Medicines for Children* (April 2015), 5th edition. 2015, pp. 1-42), and/or the WHO's Model Formulary for Children (WHO et al., *WHO Model Formulary for Children* (2010), pp. 1-528), each of which is herein incorporated in their entirety. The agent may additionally include substances like prebiotics, probiotics, milk constituents or proteins, supplemental formulas, vitamins, macronutrients, micronutrients, as well as other suitable compounds. For example, the agent may include one or several of vaccines (e.g., rotavirus vaccines), antiretrovirals (e.g., Nevirapine, combination therapies including Lamivudine, Nevirapine, and Stavudine, and other suitable antiretrovials), antimalarials (e.g., Artemisinin Combination Therapy), macronutrients, micronutrients, antibiotics (e.g., Amoxicillin, Azithromycin, Ciprofloxacin, etc.), probiotics (e.g., *lactobacillus*), prebiotics (e.g., lactoferrin, oligosaccharides, etc.), pain relievers (e.g., NSAIDS, opioids, etc.), antiparasitics (e.g., Albendazole, Praziquantel, etc.), antifungals (e.g., Fluconazole), antivirals (e.g., Aciclovir), antiprotazoals (e.g., Metronidazole), compounds correcting water, electrolytes, and acid-base disturbances (e.g., oral rehydration salts), gastrointestinal medicines, acid reflux medications, traditional or plant-based therapeutics, and/or any other therapeutic, nutrient, and/or vitamin.

In some embodiments, a combination of agents can be delivered (e.g., as in the embodiment illustrated in FIG. 15). In certain embodiments, the agent can be incorporated within a delivery vehicle (e.g., capsules, hydrogel microparticles, mini tablets, etc.). In some such embodiments, a combination of agents can be incorporated within a delivery vehicle. In some embodiments, the agent and/or delivery vehicle can include a means for changing the eventual release behavior of the agent into the supplemental fluid, such as via one or more chemical compounds or excipients. The agent and/or delivery vehicle can also be made of and/or include compounds to influence the viscosity of the local fluid environment. In some embodiments, the delivery vehicle and/or agent can be chemically treated to affect the release rate of the agent. Such chemical treatments may affect chemical changes, such as hydrophobicity changes, and/or physical changes such as one or more of structural changes, porosity changes, brittleness changes, hardness changes, and/or others to the agent if it is in solid and/or tablet form prior to use in the device.

In some embodiments, the agent is introduced in "bulk" to the delivery system 100 (e.g., in an amount up to about 30 grams) when the agent is in solid form prior to any dilution in the delivery system 100. For example, in some embodiments the delivery system 100 (e.g., the agent source 140) can be configured to hold and/or dispense up to 30 grams of the agent. In some embodiments, the delivery system 100 may be configured to dispense up to about 20 grams of the agent. As used herein, "bulk" may be used in describing the agent after it has been diluted into a solution, mixture, or more dilute gel, though the term refers to its attribute of quantity prior to use in the device.

The agent can further be provided in different "dosage forms" (e.g., physical states of the agent). For example, the dosage form of the agent can be a powder, liquid, gel, gas, or other form. The dosage form of the agent can also be a formulation of an agent that is contained for example in a tablet, a capsule, a fiber matrix, microparticles, nanoparticles, or other delivery vehicle, as described above.

In several embodiments, the delivery system and/or delivery vehicle can include excipients configured to improve one or more of the flowability (e.g., excipients functioning as lubricants and/or glidants in powder agent formulations), bioavailability, solubility, and/or taste of the agent, supplemental fluid/agent mixture, and/or supplemental fluid/breast milk/agent mixture. For example, the delivery system can include powdered milk components to improve taste or bioavailability. The delivery system and/or delivery vehicle can also include excipients that help control release of the agent to targeted areas such as that of the digestive system, oral cavity, or other areas. The delivery system and/or delivery vehicle can further include excipients that prevent curdling and agglomeration of the agent and/or supplemental fluid from the presence of other excipients. In some embodiments, the delivery system and/or delivery vehicle can also include agents and particulate properties to facilitate taste masking, and taste or texture protection. For example, the agent can be microencapsulated to maintain the original taste of the supplemental fluid, and particulate properties can be chosen to preserve the mouth-feel of the supplemental fluid.

6.0 Examples

The following examples are illustrative of several embodiments of the present technology:

1. A system for delivering an agent orally to a breastfeeding child, comprising:
   - a wearable device configured to be positioned adjacent to and/or in contact with a breast of a wearer during breastfeeding and to allow human milk from the breast to pass through the wearable device to the breastfeeding child;
   - an agent source configured to supply the agent;
   - a fluid source configured to supply a fluid; and
   - a connector fluidly coupling the wearable device to the fluid source and the agent source, wherein the connector is configured to receive a combined flow of the fluid and the agent, and wherein the wearable device is further configured to allow the combined flow to pass through the wearable device to the child.
2. The system of example 1 wherein the connector extends between the agent source and the wearable device, wherein the fluid source and the agent source are fluidly coupled in series, and wherein the agent source is configured to receive a flow of the fluid therethrough to produce the combined flow.
3. The system of example 1 or 2 wherein the wearable device is configured to simultaneously allow the human milk and the combined flow to pass through the wearable device to the child.
4. The system of any one of examples 1-3 wherein the agent source is configured to control (a) mixing of the agent within the agent source and/or (b) flow of the agent within and/or out of the agent source.
5. The system of example 4 wherein the agent source includes a flexible housing that can be squeezed by the wearer to cause mixing of the agent in the agent source and/or exit of the agent from the agent source into the connector.
6. The system of example 4 or 5 wherein the agent source includes a plunging mechanism positioned within the agent source and a handle portion coupled to the plunging mechanism, wherein movement of the handle portion causes at least a portion of the agent to flow out of the agent source and into the connector.
7. The system of any one of examples 4-6 wherein the agent source empties of the agent gravimetrically, and wherein a rate of emptying of the agent can be modified by movement of the agent source.
8. The system of any one of examples 4-7 wherein the agent source has one or more ports configured to receive a mixing device therethrough, the mixing device including at least one of a paddle, whisk, hook, or other component configured to be moved manually within the agent source to promote mixing of the agent.
9. The system of any one of examples 4-8 wherein the agent source includes a housing and a mixing utensil within the housing, wherein the mixing utensil is configured for movement relative to the housing, and wherein relative movement of the mixing utensil and the housing promotes mixing of the agent within the agent source.
10. The system of any one of examples 1-9 wherein the agent source contains at least a first channel having a first agent disposed therein and a second channel having a second agent disposed therein, wherein the first agent and the second agent can be the same agent or different agents.
11. The system of any one of examples 1-10 wherein the agent source contains one or more ports through which the agent can be added to the agent source.
12. The system of any one of examples 1-11 wherein the agent source includes a first agent source including a first agent and a second agent source including a second agent, wherein the first agent source is fluidly coupled in series to the second agent source, and wherein the first agent and the second agent can be the same agent or different agents.
13. The system of any one of examples 1-12 wherein the agent source includes multiple exit ports fluidly coupling the agent source to the connector.
14. The system of any one of examples 1-13 wherein the agent source is perforated and wherein the connector substantially surrounds the agent source.
15. The system of any one of examples 1-14 wherein the connector is a first connector extending between the agent source and the wearable device, and further comprising a second connector extending between and fluidly coupling the agent source and the wearable device.
16. The system of any one of examples 1-15 wherein the connector is a first connector extending between the agent source and the wearable device, and further comprising a second connector extending between and fluidly coupling the fluid source and the first connector.

17. The system of any one of examples 1-16 further comprising a second connector extending between and fluidly coupling the agent source and the fluid source.

18. A delivery system for delivering an agent orally to a breastfeeding child, comprising:

a flexible device including a nipple portion and a broad portion, wherein the nipple portion is positionable over a nipple of a breast of a human user and includes a plurality of openings that permit human milk from the breast to pass through the wearable device to the breastfeeding child;

a supplemental fluid source configured to hold a supplemental fluid;

an agent source configured to hold the agent, wherein the supplemental fluid source is coupled to the agent source to permit flow of the supplemental fluid from the fluid source into the agent source; and a connector extending between the agent source and the wearable device, wherein the agent source is configured to permit flow of the supplemental fluid and the agent (a) from the agent source into the connector and (b) from the connector into the nipple portion of the flexible device, wherein the plurality of openings further permit the supplemental fluid and agent to pass through the wearable device to the breastfeeding child.

19. A method for delivering an agent orally to a breastfeeding child, comprising:

positioning a flexible device over a breast of a human user such that milk from the breast can pass through openings in the flexible device to the breastfeeding child;

at a supply source, mixing a supplemental fluid with the agent to form a supplemental mixture; and flowing the supplemental mixture from the supply source to the flexible device such that the supplemental mixture can pass through the openings in the flexible device to the breastfeeding child.

20. The method of example 19 wherein the supplemental mixture includes a bulk amount of the agent.

21. A system for delivering an agent orally to a breastfeeding child, the device comprising:

a wearable device configured to be positioned adjacent to and/or in contact with the breast during breastfeeding;

a supplemental fluid source configured to house a supplemental fluid;

an agent source configured to house an agent;

a connector configured to place the fluid source and the agent source in fluid communication with the wearable device;

wherein, when the wearable device is positioned on the breast and the child is breastfeeding, fluid flows (a) from the fluid source through the agent source into the connector, (b) from the connector into the wearable device, and (c) from the wearable device into the child, and wherein the device is configured so that human milk from the breast may additionally and/or simultaneously pass through the wearable device into the child.

22. The system of example 21 wherein the agent source is sized to receive the agent therein and any necessary supplemental fluid from the supplemental fluid source to suspend, and/or dissolve, and/or disintegrate the agent.

23. The system of example 21 or 22 wherein a dosage form of the agent initially loaded in the agent source prior to use includes one or more of powders; tablets; micro-tablets; crushed tablets; fabrics; textiles; or fibers impregnated with the agent; capsules containing a gel, liquids, powders, micro-powders, nano-powders, gases or other substances to be released; gels; pastes; syrups or other semi-solids; solids; viscous or non-viscous liquids (e.g., suspensions, solutions, sprays), gases; drug delivery vehicles made up of materials such as responsive polymers or porous fibers, containing an agent.

24. The system of any one of examples 21-23 wherein the system and/or a dosage form of the agent includes a means for changing the release behavior of the agent into the supplemental fluid.

25. The system of example 24 wherein the release behavior of the agent into the supplemental fluid is changed by the presence of one or more chemical compounds or excipients.

26. The system of example 24 or 25 wherein the release behavior of the agent into the supplemental fluid is changed by the inclusion of a formulation to influence the viscosity of the local fluid environment.

27. The system of any one of examples 24-26 wherein the release behavior of the agent into the supplemental fluid is changed by a chemical treatment of, or within, the agent prior to use in the device which induces hydrophobicity changes.

28. The system of any one of examples 24-27 wherein the release behavior of the agent into the supplemental fluid is changed by the agent having been pre-processed under a set of manufacturing conditions which induces the dosage form to dissolve, disintegrate, release the agent, or a combination thereof, more quickly.

29. The system of example 28 wherein the agent is lyophilized, freeze dried or vacuum dried before use in the device.

30. The system of example 28 or 29 wherein the dosage form is chemically treated before use in the device.

31. The system of any one of examples 28-30 wherein the agent is part of one or more of a delivery vehicle or capsule or tablet or film dosage form which is perforated.

32. The system of any one of examples 28-31 wherein the eventual release behavior of the agent into the supplemental fluid is changed by the agent dosage form having been made brittle.

33. The system of example 32 wherein the dosage form has been lyophilized or freeze-dried.

34. The system of any one of examples 28-33 wherein the dosage form comprising a tablet has been compressed at specific compression values to facilitate controlled agent release.

35. The system of any one of examples 28-34 wherein the dosage form comprising a tablet has been treated at various humidity levels to facilitate controlled agent release.

36. The system of any one of examples 28-35 wherein the dosage form comprising a tablet has been lyophilized.

37. The system of any one of examples 21-36 wherein the dosage form of the agent includes excipients to improve bioavailability and/or solubility of the agent, and/or the disintegration rate of the dosage form and/or taste.

38. The system of example 37 wherein the excipients include powdered milk components.

39. The system of example 37 or 38 wherein the dosage form includes excipients to control the disintegration rate of the dosage form.

40. The system of example 39 wherein the excipients include one or more disintegrants.

41. The system of example 39 or 40 wherein the particle size of the excipients is chosen to facilitate disintegration of the dosage form.

42. The system of any one of examples 37-41 wherein the dosage form includes excipients to control release of the therapeutic or therapeutics in targeted areas of the digestive system.

43. The system of example 42 wherein the excipients are pH responsive.

44. The system of any one of examples 37-43 wherein the dosage form includes excipients to prevent or reduce curdling and/or agglomeration of milk from the presence of other excipients.

45. The system of any one of examples 37-44 wherein the dosage form includes substances and/or utilizes particulate properties to facilitate taste masking, and taste and/or texture protection.

46. The system of example 45 wherein the dosage form is microencapsulated to preserve taste and/or mouthfeel of the supplemental fluid.

47. The system of any one of examples 21-46 wherein the agent includes a therapeutic or therapeutics.

48. The system of example 47 wherein the therapeutic is efficacious in the treatment and/or prevention of vitamin deficiency (e.g., vitamin A, vitamin C, vitamin D) and/or mineral deficiency (e.g., iron, zinc, calcium, folate) and/or malnourishment (e.g., alpha-lactalbumin, polyunsaturated fatty acids), generalized or localized pain, allergic reactions, seizure, infection (e.g., parasitic, bacterial, leprotic, tuberculotic, fungal, viral, retroviral, hepatic, protozoal, and/or of another sort), migraine, immune system disorders, imbalances, or autoimmune disease, hormonal imbalances, endocrine disorders, anaemia, haemoglobinopathies, hypertension, lipid disorders, dermatological disease (e.g., fungal, infective, pruritic, or scabicidal), ophthalmic disease, sepsis, gastrointestinal disease (e.g., ulcers, vomiting, nausea, constipation), diarrhea, dehydration, poisoning, venom toxicity, inflammation, psychosis, mood disorders, depression, psychiatric disorders, asthma, electrolyte and acid-base disturbances, joint disease, rheumatoid disorders, and/or any other pathology. The agent may include any therapeutic contained in the World Health Organization's (WHO's) Essential Medicines List (WHO et al., *19th WHO Model List of Essential Medicines* (April 2015), 19th edition. 2015, pp. 1-53, which is incorporated herein by reference in its entirety), the WHO'S Essential Medicines List for Children (WHO et al., *5th WHO Model List of Essential Medicines for Children* (April 2015), 5th Edition. 2015) pp. 1-42, or the WHO's Model Formulary for Children (WHO et al., *WHO Model Formulary for Children,* 2010, pp. 1-528, incorporated herein by reference in its entirety), and additionally substances like prebiotics, probiotics, milk constituents or proteins, supplemental formula, vitamins, macronutrients, micronutrients, and a host of other compounds. For example, the agent X may include one or several of vaccines (e.g., rotavirus vaccines), antiretrovirals (e.g., Nevirapine or combination therapies like Lamivudine+Nevirapine+Stavudine), antimalarials (e.g., Artemisinin Combination Therapy), macronutrients, micronutrients, antibiotics (e.g., Amoxicillin, Azithromycin, Ciprofloxacin), probiotics (e.g., *lactobacillus*), prebiotics (e.g., lactoferrin, oligosaccharides), pain relievers (e.g., NSAIDS, opioids), antiparasitics (e.g., Albendazole, Praziquantel), antifungals (e.g., Fluconazole), antivirals (e.g., Aciclovir), antiprotazoals (e.g., Metronidazole), compounds correcting water, electrolyte, and acid-base disturbances (e.g., oral rehydration salts), gastrointestinal medicines, acid reflux medications, traditional or plant-based therapeutics, and/or any other therapeutic and/or nutrient and/or vitamin. and/or any other pathology.

49. The system of any one of examples 21-48 wherein the wearable device includes openings of a size, shape, and configuration which are conducive to the flow of breast milk and/or a breast milk/agent mixture, and/or supplemental fluid, and/or a supplemental fluid/agent mixture, and/or a breast milk/supplemental fluid mixture, and/or a supplemental agent/breast milk/agent mixture through them.

50. The system of example 49 wherein the shape and/or size of the openings changes when the device is positioned on the breast and the child is breastfeeding in order to facilitate the flow of breast milk and/or a breast milk/agent, and/or supplemental fluid, and/or a supplemental fluid/agent mixture, and/or a breast milk/supplemental fluid mixture, and/or a supplemental agent/breast milk/agent mixture.

51. The system of example 49 or 50 wherein fluid and/or gel exits the wearable device into the baby when the baby has a strong enough oral vacuum during breastfeeding and/or the infant has a strong enough tongue moving against the wearable device during suckling 52. The system of any one of examples 21-51 wherein clogging of the fluid and/or gel can be minimized due to perturbations introduced into the system by the movement of the infant's tongue during suckling 53. The system of any one of examples 21-52 wherein the wearable device, agent source, supplemental fluid source, and/or connector and/or the agent are of a variety of colors.

54. The system of example 53 wherein the colors of the wearable device, agent source, supplemental fluid source, and/or connector are transparent.

55. The system of example 53 or 54 wherein the colors of the wearable device, agent source, supplemental fluid source, and/or connector and/or the agent are chosen to match the skin tone(s) of the user(s).

56. The system of any one of examples 53-55 wherein the colors of the wearable device, agent source, supplemental fluid source, and/or connector and/or the agent are chosen to correspond with different agents.

57. The system of any one of examples 53-56 wherein the colors of the wearable device, agent source, supplemental fluid source, and/or connector and/or the agent are chosen to correspond with different ages of breastfeeding children.

58. The system of any one of examples 21-57 wherein the wearable device is of different sizes to accommodate different anatomies.

59. The system of any one of examples 21-58 wherein the wearable device is shaped like a nipple shield.

60. The system of any one of examples 21-59 wherein the shape of a horizontal cross section of the wearable device in the section adjacent to the breast is triangular with rounded corners.

61. The system of any one of examples 21-60 wherein the shape of a horizontal cross section of the wearable device in the section adjacent to the breast is in the shape of a pinched ellipse.

62. The system of any one of examples 21-61 wherein the shape of a horizontal cross section of the wearable device in the section adjacent to the breast is roughly circular.

63. The system of example 62 wherein the material thinness of the wearable device in the section placed in the infant's mouth facilitates force transfer and a normal mouthfeel in the oral cavity, and the thickness of the wearable device in the section adjacent to the breast gives the wearable device structural integrity.

64. The system of any one of examples 21-63 wherein the entire wearable device is thin to facilitate minimization of the wearable device's effects on breastfeeding.

65. The system of example 64 wherein the thickness of the wearable device is less than about 1 mm.

66. The system of example 65 wherein the wearable device is less than about 0.3 mm in thickness.

67. The system of any one of examples 64-66 wherein the surface of the wearable device of is textured.

68. The system of example 67 wherein the external surface of the wearable device is textured like that of a woman's breast.

69. The system of example 67 or 68 wherein features are added to the external surface of the wearable device including one or more of bumps, ridges, pits, or any other features.

70. The system of example 69 wherein the features increase the comfort of using the wearable device for the child.

71. The system of example 69 or 70 wherein the features facilitate the latching-on of the child.

72. The system of any one of examples 67-71 wherein the internal surface of the wearable device is textured like that of a child's oral cavity.

73. The system of any one of examples 67-72 wherein features are added to the internal surface of the wearable device including one or more of bumps, ridges, pits, or any other features.

74. The system of example 73 wherein the features increase the comfort of using the system for the mother.

75. The system of examples 73 or 74 wherein the features facilitate the secure placement of the wearable device on the mother.

76. The system of any one of examples 21-75 wherein the wearable device incorporates holes.

77. The system of example 76 wherein the holes facilitate greater skin-to-skin contact while breastfeeding.

78. The system of any one of examples 21-77 wherein part or all of the material of the wearable device, supplemental fluid source, agent source, and/or connector is biodegradable.

79. The system of example 78 wherein the material of the wearable device, supplemental fluid source, agent source, and/or connector incorporates a biodegradable polymer.

80. The system of example 79 wherein the wearable device, supplemental fluid source, agent source, and/or connector is made up of in whole or in part by poly(lactic-co-glycolic acid).

81. The system of any one of examples 21-80 wherein part or all of the material of the wearable device, supplemental fluid source, agent source, and/or connector has a suitability for burning and/or recyclability.

82. The system of example 81 wherein the material of the wearable device, supplemental fluid source, agent source, and/or connector is biodegradable, thermoresponsive, and/or able to be repurposed.

83. The system of example 81 or 82 wherein the wearable device, supplemental fluid source, agent source, and/or connector degrades after being left on the ground in the open and/or in an anaerobic environment.

84. The system of any one of examples 81-83 wherein the wearable device, supplemental fluid source, agent source, and/or connector degrades after being soaked in water.

85. The system of any one of examples 21-84 wherein the wearable device, supplemental fluid source, agent source, and/or connector is disposable.

86. The system of any one of examples 21-85 wherein at least a portion of the wearable device, supplemental fluid source, agent source, and/or connector is made up of an emulsion of polymers, such as latex.

87. The system of any one of examples 21-86 wherein the wearable device, supplemental fluid source, agent source, and/or connector is made in whole or in part by injection molding, dip-molding, casting, compression molding, extrusion molding, machining, 3D printing, or a combination thereof.

88. The system of any one of examples 21-87 wherein the connector runs into and along the inside of the wearable device.

89. The system of any one of examples 21-88 wherein the connector of the device is attached to the wearable device at a port.

90. The system of example 89 wherein the port is equipped with a valve.

91. The system of example 89 or 90 wherein the valve is a one-way valve.

92. The system of any one of examples 89-91 wherein a tube or channel runs from the port carrying the agent along the inside of the wearable device and ending in any location within the wearable device.

93. The system of any one of examples 89-92 wherein a filter is between the connector and the wearable device at an attachment interface to prevent clumps of agent from entering the wearable device.

94. The system of any one of examples 21-93 wherein the connector can come in variable lengths to accommodate different set-up configurations and/or breastfeeding positions.

95. The system of any one of examples 21-94 wherein the internal surface of the connector is attached to prevent clogging.

96. The system of any one of examples 21-95 wherein the connector is a tube or a multiplicity of tubes.

97. The system of example 96 wherein the tube or tubes are made of plastic.

98. The system example 96 or 97 wherein the tube or tubes are flexible.

99. The system of example 98 wherein the tube or tubes can be squeezed to encourage flow if clogged and/or to control flow rates.

100. The system of any one of examples 96-99 wherein the tube or tubes enter the wearable device and run along the inside of the wearable device until they end within the wearable device.

101. The system of any one of examples 96-100 wherein the tube or tubes attach to the wearable device at a port where the connector terminates.

102. The system of example 101 wherein a filter is between the connector and the wearable device at and attachment interface to prevent lumps of agent from entering the wearable device.

103. The system of any one of examples 21-102 wherein the agent source may take any one of a variety of forms such as a bag, tube, or other form.

104. The system of any one of examples 21-104 wherein the flow of agent from the agent source can be controlled before and/or after use.

105. The system of example 104 wherein the connector is connected to an agent source at a port.

106. The system of example 105 wherein the port is a one-way valve.

107. The system of example 105 or 106 wherein the tube or tubes have a filter between the agent source and the beginning of the connector to prevent clumps of agent from entering the connector from the agent source.

108. The system of any one of examples 104-107 wherein the agent source is flexible.

109. The system of example 108 wherein the agent source can be squeezed to cause one or more of mixing in the agent source, and/or exit of material from the agent source into the connector.

110. The system of example 109 wherein the agent source can be squeezed to cause the movement of one or more flaps which change in position from covering the intersection of the agent source and the connector, to uncovering this intersection when squeezed.

111. The system of example 110 wherein the intersection of the agent source and the connector has a port.

112. The system of any one of examples 104-111 wherein the agent source empties into the connector when a button on the reservoir is pressed.

113. The system of example 112 wherein the agent source empties when a button on the reservoir is pressed due to a covering over a port between the agent source and connector moving to uncover the port in response.

114. The system of example 113 wherein the button and the port cover are connected by a bar such that a change in position of the button results in movement of the bar and thereby movement of the port cover which is attached at the other end of the bar.

115. The system of example 114 wherein the agent source empties when an external component on the agent source, which is attached to a plunger mechanism in the agent source, is pressed down, thereby resulting in injection of the agent contents into the connector.

116. The system of example 114 or 115 wherein the agent source empties gravimetrically, and can be modified by movement up or down of the agent source.

117. The system of any one of examples 114-116 wherein the agent source has graduated volume markings on it.

118. The system of any one of examples 114-117 wherein the agent source can be mixed during use.

119. The system of example 118 wherein the mixing promotes disintegration, dissolution, mixing, and/or suspension of the agent and/or prevents clogging.

120. The system of example 119 wherein the agent source has a port through which a mixing device such as a paddle, whisk, hook, or other component, can be inserted and moved manually.

121. The system of example 119 or 120 wherein the agent source has a concave disc that when pressed on will invert the shockwave of the click to cause movement of the contents in the agent source, promoting mixing.

122. The system of any one of examples 119-121 wherein the agent source can be mixed by turning the agent source.

123. The system of example 122 wherein the agent source has an internal fixed component which promotes mixing which may be one or more of a paddle, whisk, hook, or other component.

124. The system of example 122 or 123 wherein the agent source is equipped with a dial that drives the rotation of the agent source or of a mixing component that may be one or more of a paddle, whisk, hook, or other component.

125. The system of example 124 wherein the motion is driven by gears.

126. The system of any one of examples 21-125 wherein the agent source contains numerous channels which are loaded with the same or different agents, thus minimizing the risk that clogging in the agent source would completely block fluid flow into the connector.

127. The system of example 126 wherein the agent source can be rotated or manually moved to change which channels the supplemental fluid source flows through.

128. The system of example 126 or 127 wherein the flow from the supplemental fluid source to the agent source is controlled by one or more valves.

129. The system of any one of examples 21-128 wherein the agent source contains one or more ports through which more agent can be added.

130. The system of any one of examples 21-129 wherein the agent source can be connected to one or more agent sources in series, the last of which connects to the connector.

131. The system of any one of examples 21-130 wherein multiple agent sources can be connected to the connector each at a different point along the connector.

132. The system of any one of examples 21-131 wherein the agent source has multiple holes, some of which may clog but which due to the numerous holes largely allows exit of agent from the agent source into the connector, thereby limiting the effects of clogging on agent transfer.

133. The system of example 132 wherein there is a funnel between the agent source and the connector.

134. The system of example 132 or 133 wherein the connector starts wide at the attachment interface and becomes more narrow.

135. The system of any one of examples 132-134 wherein the agent source is spherical or cylindrical in shape.

136. The system of any one of examples 21-135 wherein the agent source is perforated and mostly encased by the connector.

137. The system of example 136 wherein the agent source is spherical in shape, cylindrical, or otherwise shaped such that it fits into the connector.

138. The system of any one of examples 21-137 wherein the agent source is attached to the connector anywhere along the length of the connector and a fluid line is attached separately to the supplemental fluid region from the agent source.

139. The system of example 138 wherein there is a valve between the agent source and/or the connector and/or between the supplemental fluid region and the agent source and/or between the supplemental fluid region and the connector.

140. The system of any one of examples 21-139 wherein multiple agent sources are attached to the connector anywhere along the length of the connector and one or more fluid lines are attached separately to the supplemental fluid regions from the agent sources.

141. The system of any one of examples 21-140 wherein there is also a fluid line from the supplemental nursing reservoir that circumvents the agent source so that clogging in the agent source does not prevent the fluid from the supplemental fluid source from reaching the infant.

142. The system of example 141 wherein the fluid flow in the additional fluid line can be controlled using valves.

143. A method of using a system of any one of claims 1-142 substantially as disclosed herein.

7.0 Conclusion

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. For example, although many of the embodiments are described above with respect to systems for delivering an agent in bulk amounts to a human child, other applications and other embodiments in addition to those described herein are within the scope of the technology. For example, the delivery systems of the present technology can be used for delivering a substance to an animal. Moreover, any one of the embodiments of delivery systems disclosed herein may not necessarily incorporate the flow of breast milk or another fluid, gel, suspension, paste, etc. in the agent delivery process. In addition, any one of the embodiments of delivery systems disclosed herein may not necessarily deliver a bulk amount of agent but could also be used to deliver smaller amounts of agent.

In some cases, well-known structures and functions have not been shown and/or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may have been disclosed in the context of those embodiments, other embodiments can also exhibit such advantages, and not all embodiments need necessarily exhibit such advantages or other advantages disclosed herein to fall within the scope of the present technology. Accordingly, this disclosure and associated technology can encompass other embodiments not expressly shown and/or described herein.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the terms "comprising" and the like are used throughout this disclosure to mean including at least the recited feature(s) such that any greater number of the same feature(s) and/or one or more additional types of features are not precluded. Reference herein to "one embodiment," "an embodiment," or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

We claim:

1. A system for use with a breastfeeding child, the system comprising:

a wearable device configured to be positioned adjacent to and/or in contact with a breast of a wearer during breastfeeding and to allow human milk from the breast to pass through the wearable device to the breastfeeding child;

a fluid source having a first housing configured to hold a fluid;

an agent source having a second housing separate from and outside of the first housing and fluidly coupled to the first housing to receive the fluid from the fluid source, wherein the second housing is flexible, and comprises an outlet and a port separate from the outlet;

an agent in solid form configured to be positioned within the second housing through the port, wherein the second housing is configured to be squeezed by the wearer to directly disintegrate the agent within the second housing and mix the agent with the fluid within the second housing to form a fluid-agent mixture within the second housing; and a connector coupling the wearable device to the fluid source and the outlet of the second housing, wherein the connector is configured to receive a flow of the fluid-agent mixture, and wherein the wearable device is further configured to allow the flow of the fluid-agent mixture to pass through the wearable device to the breastfeeding child.

2. The system of claim 1 wherein the connector extends between the agent source and the wearable device, and wherein the fluid source and the agent source are fluidly coupled in series.

3. The system of claim 1 wherein the wearable device is configured to simultaneously allow the human milk and the flow of the fluid-agent mixture to pass through the wearable device to the breastfeeding child.

4. The system of claim 1 wherein the agent source is configured to control the flow of the fluid-agent mixture within and/or out of the agent source.

5. The system of claim 1 wherein the second housing is further configured to be squeezed by the wearer to cause exit of the fluid-agent mixture from the agent source into the connector.

6. The system of claim 1 wherein the agent source includes a plunging mechanism positioned within the second housing and a handle portion coupled to the plunging mechanism, wherein movement of the handle portion is configured to cause at least a portion of the fluid-agent mixture to flow out of the agent source and into the connector.

7. The system of claim 1 wherein the agent source is configured to empty of the fluid-agent mixture gravimetrically, and wherein a rate of emptying the fluid-agent mixture can be modified by movement of the agent source.

8. The system of claim 1 wherein the port is configured to receive a mixing device therethrough, wherein the mixing device includes at least one of a paddle, whisk, hook, or other component configured to be moved manually within the second housing to promote mixing of the agent with the fluid within the second housing to form the fluid-agent mixture.

9. The system of claim 1 wherein the agent is a first agent, wherein the second housing contains at least a first channel having the first agent disposed therein and a second channel having a second agent disposed therein, and wherein the first agent and the second agent can be a same agent or different agents.

10. The system of claim 1 wherein the connector is a first connector, and the system further comprises a second connector extending between and fluidly coupling the fluid source and the first connector.

11. The system of claim 1 wherein the second housing is perforated.

12. The system of claim 1 wherein the agent comprises 20 grams or more of the agent in solid form.

13. The system of claim 1 wherein the agent comprises a tablet.

14. The system of claim 1 wherein the second housing is fluidly coupled to the first housing via a valve.

* * * * *